(12) United States Patent
Reimann et al.

(10) Patent No.: US 6,880,354 B2
(45) Date of Patent: Apr. 19, 2005

(54) CONDENSATE PUMP FOR ROOFTOP AIR CONDITIONING UNIT

(75) Inventors: Robert C. Reimann, LaFayette, NY (US); Andreas Hille, Renningen (DE); Belin Czechowicz, Dewitt, NY (US)

(73) Assignee: Carrier Corporation, Farmington, CT (US)

( * ) Notice: Subject to any disclaimer, the term of this patent is extended or adjusted under 35 U.S.C. 154(b) by 58 days.

(21) Appl. No.: 10/429,391

(22) Filed: May 5, 2003

(65) Prior Publication Data

US 2004/0221606 A1 Nov. 11, 2004

(51) Int. Cl.$^7$ ................................................. B60H 1/32
(52) U.S. Cl. ........................................ 62/280; 62/244
(58) Field of Search ........................... 62/279, 280, 244, 62/228.4, 239, 259.1

(56) References Cited

U.S. PATENT DOCUMENTS

| | | | | |
|---|---|---|---|---|
| 3,805,541 A | * | 4/1974 | Hosoda et al. | 62/262 |
| 4,136,529 A | * | 1/1979 | McCarty | 62/280 |
| 4,494,384 A | | 1/1985 | Lott | |
| 4,641,502 A | * | 2/1987 | Aldrich et al. | 62/244 |
| 5,199,274 A | * | 4/1993 | Yoshida et al. | 62/228.4 |
| 5,461,879 A | * | 10/1995 | Bolton et al. | 62/280 |

FOREIGN PATENT DOCUMENTS

| | | |
|---|---|---|
| DE | 41 10 081 | 10/1992 |
| EP | 1 083 068 | 3/2001 |
| FR | 2 306 098 | 10/1976 |

* cited by examiner

Primary Examiner—Harry B. Tanner
(74) Attorney, Agent, or Firm—Wall Marjama & Bilinski LLP

(57) ABSTRACT

A compact rooftop air conditioning unit for a vehicle, said unit having an evaporator coil located adjacent to a condenser coil. At least one cylindrical blower is mounted adjacent the evaporator coil and is arranged to provide conditioned supply air to the interior of the vehicle. An electric motor is used to turn the shaft of the blower and a condensate pump is secured to the shaft for pumping condensate generated by the evaporator coil back over the condenser coil. An electrically driven compressor is housed within the unit and is arranged so that no refrigerant lines pass outside of the unit. An inverter is also housed within the unit and provides a regulated input to the compressor and the evaporator and condenser drive motors.

15 Claims, 4 Drawing Sheets

CONDENSATE PUMP FOR ROOFTOP AIR CONDITIONING UNIT

CROSS REFERENCE TO RELATED APPLICATIONS

This application is related to the following pending applications being concurrently filed herewith and assigned to the assignee of the present invention:

| Title | Our Docket No.: |
|---|---|
| Modular Rooftop Air Conditioner for a Bus | 210_546 |
| Modular Bus Air Conditioning System | 210_545 |
| Supply Air Blower Design in Bus Air Conditioning Units | 210_549 |
| Bus Rooftop Condenser Fan | 210_550 |
| Method and Apparatus for Refreshing Air in a Bustop Air Conditioner | 210_548 |
| Coil Housing Design for a Bus Air Conditioning Unit | 210_547 |
| Integrated Air Conditioning Module for a Bus | 210_558 |
| Fresh Air Intake Filter and Multi Function Grill | 210_554 |
| Integrated Air Conditioning Module for a Bus | 210_557 |
| Modular Air Conditioner for a Bus | 210_561 |
| Modular Air Conditioner for a Bus Rooftop | 210_562 |
| Evaporator Section for a Modular Bus Air Conditioner | 210_564 |
| Wide Evaporator Section for a Modular Bus Air Conditioner | 210_565 |
| Condensate Pump for Rooftop Air Conditioning Unit | 210_568 |
| Condensate Removal System Rooftop Air Conditioning | 210_551 |
| Modular Rooftop Unit Supply Air Ducting Arrangement | 210_577 |
| Configuration for Modular Bus Rooftop Air Conditioning System | 210_595 |
| Unibody Modular Bus Air Conditioner | 210_596 |

FIELD OF THE INVENTION

This invention relates to a low profile rooftop air conditioning unit for a vehicle and, in particular, to a rooftop unit for a bus.

BACKGROUND OF THE INVENTION

The most common approach for air conditioning the interior of a bus is to mount the air conditioning components on the roof of the vehicle. It has been the common practice in the industry to locate the compressor for the unit in the vehicles motor compartment so that it can be driven directly from the engine. The compressor, in turn, must be connected to the air conditioning unit by means of refrigerant supply and return lines. This requires running an extensive amount of piping through the bus between the engine compartment and air conditioner.

In addition, the evaporator coil that is contained in the rooftop unit can also generate a good deal of condensate which must be disposed of in someway. In many prior art rooftop air conditioning systems, the condensate produced by the evaporator coil is collected in the floor panel or pan of the unit and is drained to the exterior of the vehicle by means of drainage hoses. The drainage often times runs over the surface of the vehicle producing unwanted stains and films windows which can be hazardous. Typically, the rooftop air conditioners are relatively large units having a high profile which produces a good deal of drag even as the vehicle moves at a relatively low speed.

SUMMARY OF THE INVENTION

It is therefore an object of the present invention to improve air conditioning units that are mounted upon the roof of a bus or any other similar type vehicle.

It is a further object of the present invention to improve condensate removal from an air conditioning unit that is mounted upon the roof of a motor vehicle.

It is a still further object of the present invention to more efficiently remove condensate from an air conditioning unit that is mounted upon the roof of a bus.

Another object of the present invention is to eliminate the need for drainage hoses for removing condensate from an air conditioner that is mounted upon the roof of a bus.

Yet another object of the present invention is to provide a condensate removal system that can operate effectively in a low profile rooftop air conditioner for a bus.

These and other objects of the present invention are attained by a compact air conditioning unit that is mounted upon the rooftop of a bus or similar type vehicle. The unit contains an electrically driven compressor and an inverter for regulating the electrical input to the electrical components contained within the unit. The evaporator coil of the unit is mounted adjacent to the condenser coil and at least one cylindrical fan is mounted adjacent the evaporator coil upon a horizontally disposed shaft which, in turn, is rotated by an electrical motor. A circular disc is mounted upon the shaft and is enclosed within a housing. A drip pan is positioned beneath the evaporator coil and is arranged to pass the collected condensate into the sump of the pump housing through an inlet port. The condensate in the sump is pumped by the disc into a discharge tube that is arranged to distribute the condensate over the heat exchanger surfaces of the condenser coil whereupon the condensate is evaporated.

BRIEF DESCRIPTION OF THE DRAWINGS

For a further understanding of these and objects of the invention, reference will be made to the following detailed description of the invention that is to be read in association with the accompanying drawing, wherein:

FIG. 6 is an enlarged partial sectional view taken along lines 6—6 in FIG. 3.

DETAILED DESCRIPTION OF THE INVENTION

Figure 1:
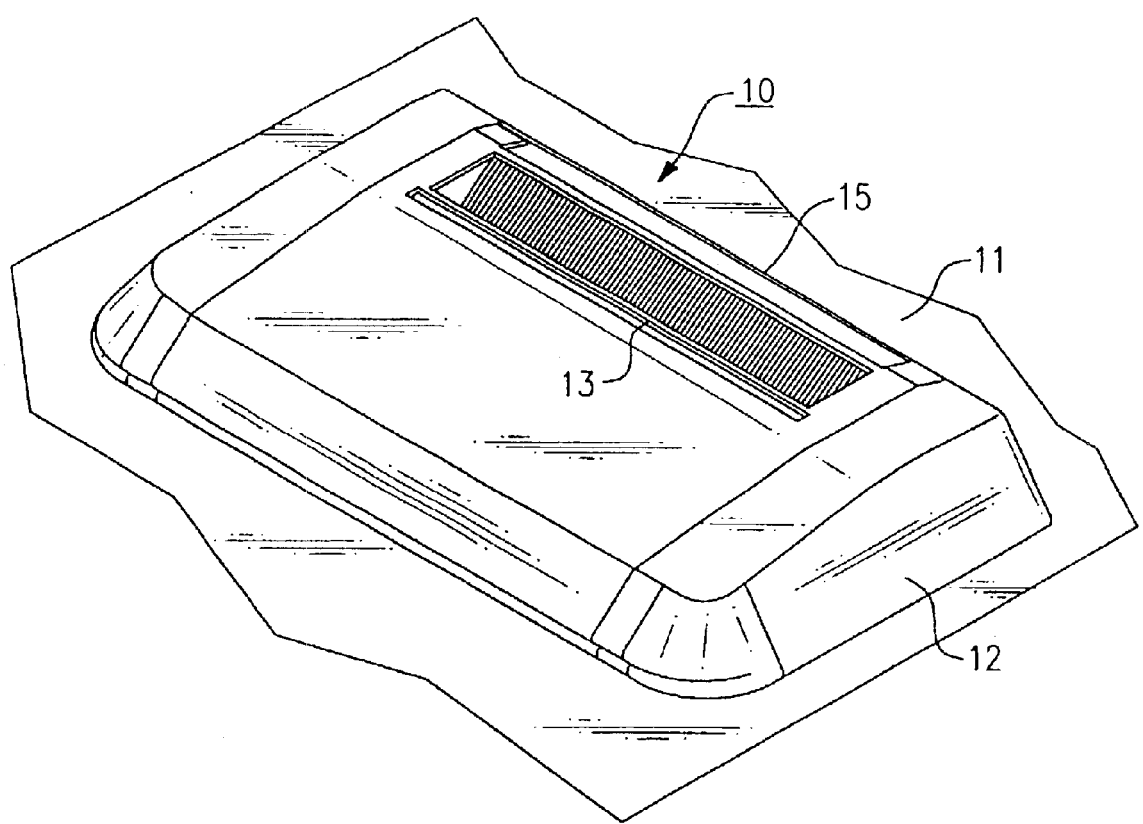
FIG. 1 is a perspective view of a compact air conditioning unit suitable for mounting up the roof of a vehicle and, in particular, the roof of a passenger bus.

Turning now to the drawings, there is illustrated in FIG. 1 a low profile, compact, air conditioning unit, generally referenced 10, that is ideally well suited for mounting upon the roof 11 of a motor vehicle such as a bus. The working components of the unit are housed in a stream-lined protective cover 12 preferably fabricated of plastic. The cover contains an elongated opening 13 that extends laterally along the top of the cover. A portion of the units condenser coil 15 is located within the opening so that outside air can be drawn by the condenser fan 16 (FIG. 3) over the heat exchange surfaces of the condenser coil and then discharged to the surrounding ambient.

Figure 2:
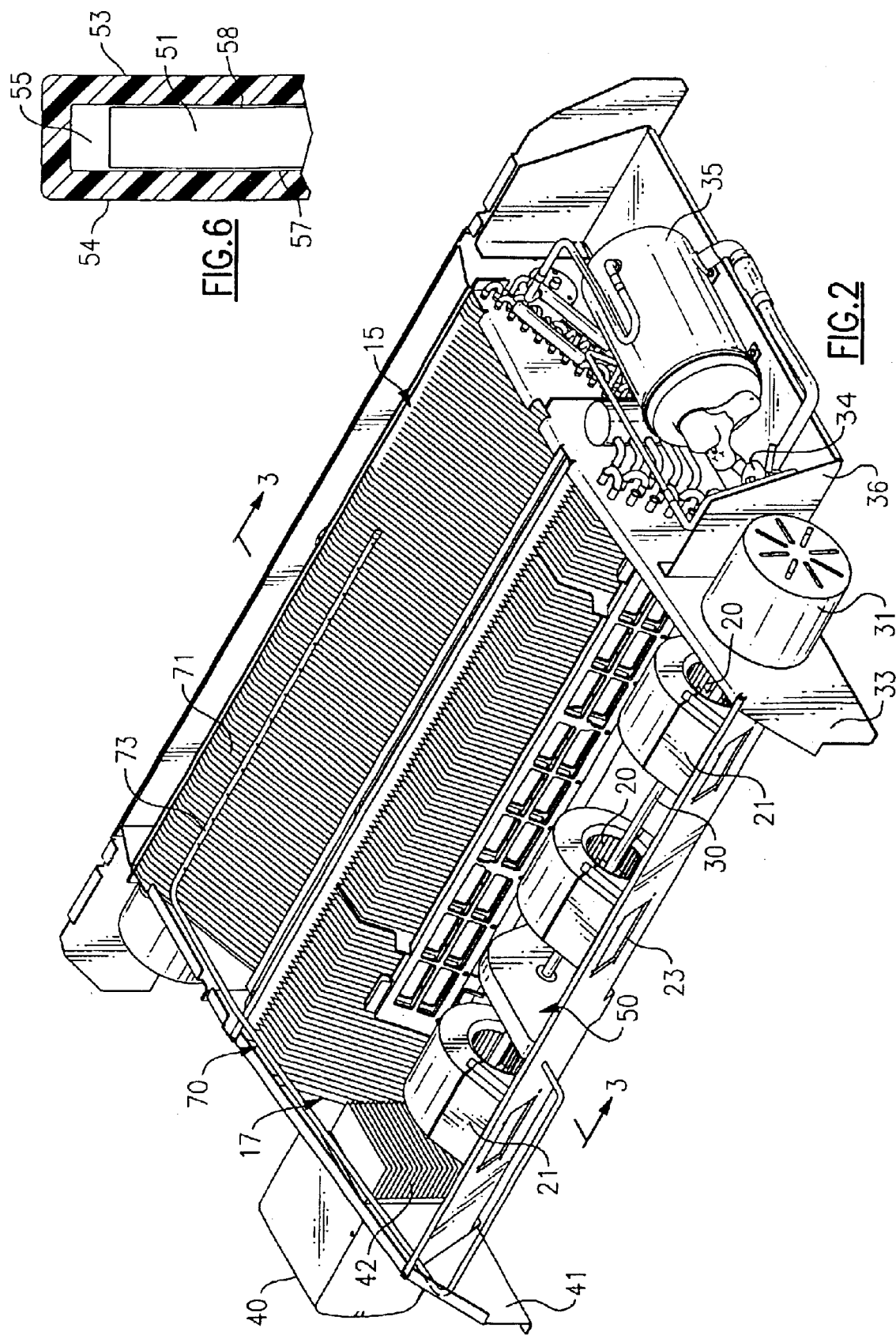
FIG. 2 is an enlarged perspective view of the air conditioning unit shown in FIG. 1 with the cover removed to better illustrate the internal components of the unit.
Figure 3:
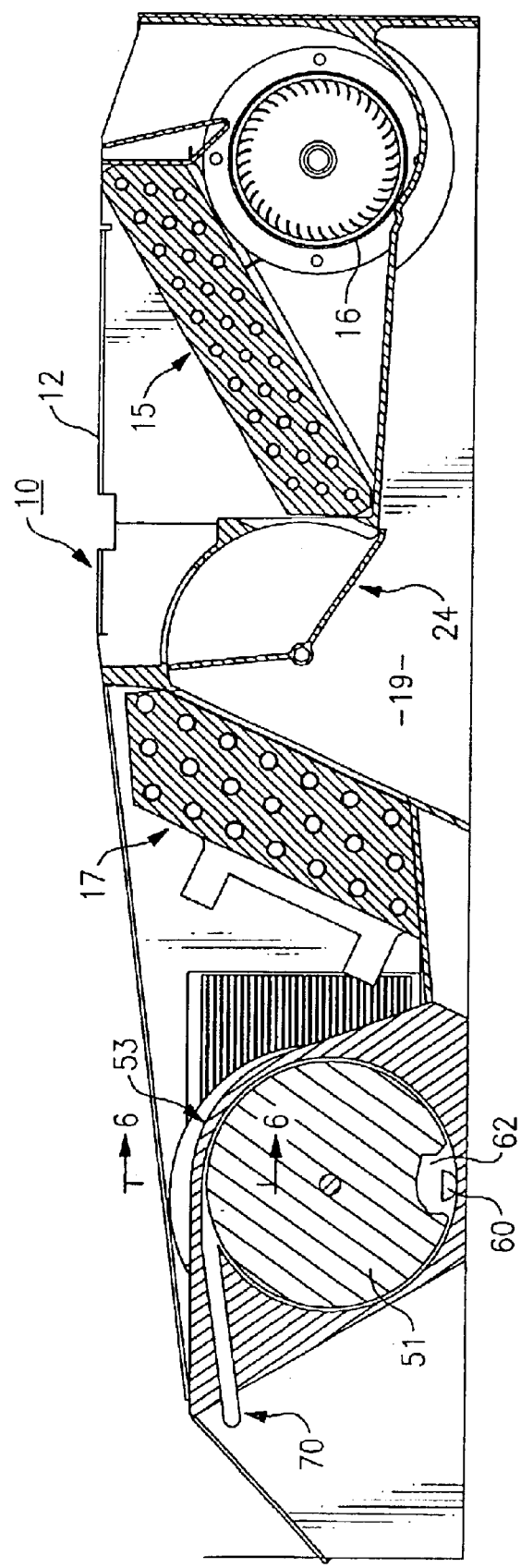
FIG. 3 is a side sectional view taken through the unit.

Turning now to FIGS. 2 and 3, the unit is illustrated with the outer cover removed to more clearly show the component parts of the unit. The evaporator coil 17 of the unit is located directly in front of the condenser coil 15. The heat exchanger fins of the two coils are contoured to provide a maximum amount of heat exchanger surface area within a minimum amount of available space. The coils, in turn, are set at an angle with regard to the base of the unit to minimize the overall height of the unit. As noted above, outside air is drawn over the surfaces of the condenser coil and is discharged through the back of the housing to ambient.

A return air duct 19 is provided in the unit between the two coils. A series of cylindrical blower wheels 20—20 are positioned in front of the evaporator coil and each blower is contained within a separate blower wheel housing 21. The blower wheels are arranged to draw return air from the passenger compartment into duct 19 and then through the evaporator coil. The conditioned supply air is then back into the passenger compartment through supply air ports 23—23. An adjustable damper 24 (FIG. 3) is located in the return air duct 19 that can be positioned to regulate the addition of outside air to the return air stream being drawn from inside the bus.

Each blower wheel is secured to a common drive shaft 30 and the drive shaft is rotated by an electric motor 31 that is mounted upon the side panel 33 of the air conditioning unit.

An electrically driven compressor 35 is mounted within a bracket 36 and the bracket is secured to the previously noted side wall 33. The compressor is connected to the two heat exchanger coils of the unit by suitable refrigerant lines and the refrigerant is throttled from the high pressure side of the system via an expansion valve 34. A compressor operates in a conventional manner to bring refrigerant from the lower pressure side of the air conditioning system to the high pressure side. The compressor 35 as well as the evaporator fan motor 31 and condenser fan motor (not shown) are all powered by a regulated electrical input from an inverter 40 which is secured to the other side panel 41 of the unit. The inverter contains a series of cooling fins 42 that extend into the evaporator region for maintaining the inverter at a desired operating temperature. Although, not shown, power to the inverter is provided by a generator that is driven by the engine of the vehicle.

As should now be evident, in this arrangement of components, there is no need to pass refrigerant lines through the passenger compartment of the bus. Accordingly, the chance of moisture generated by refrigerant lines within the compartment is eliminated.

Figure 4:
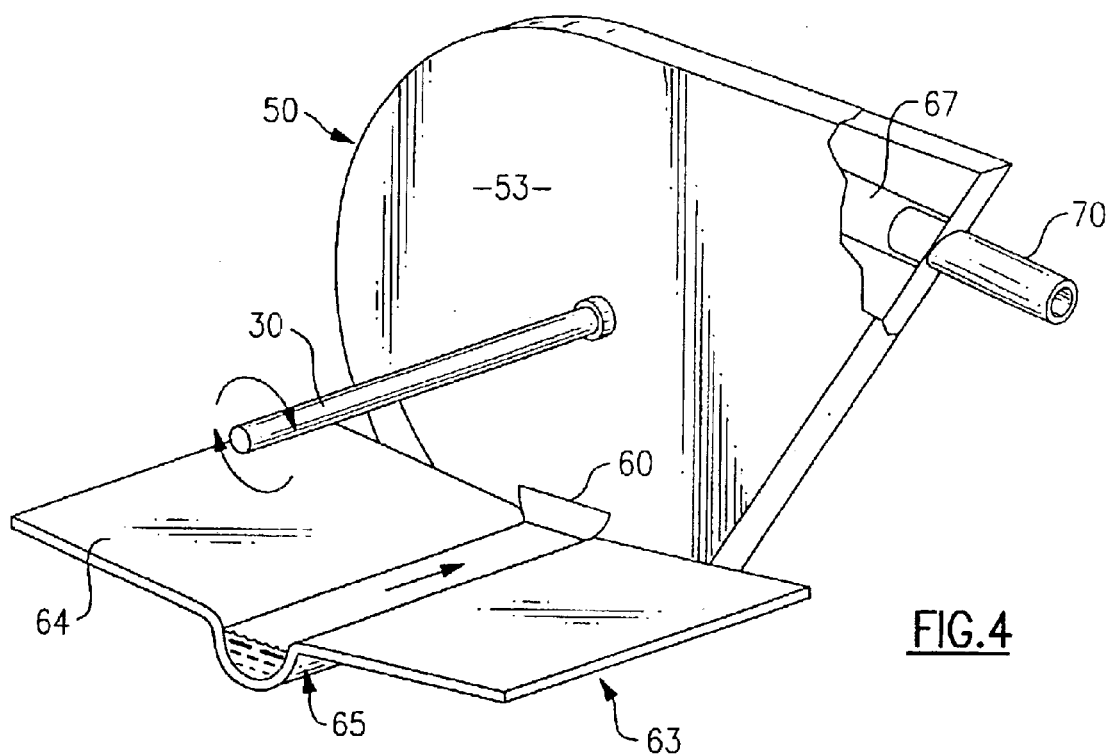
FIG. 4 is an enlarged front perspective view illustrating the condensate pump employed in the present rooftop unit.
Figure 5:
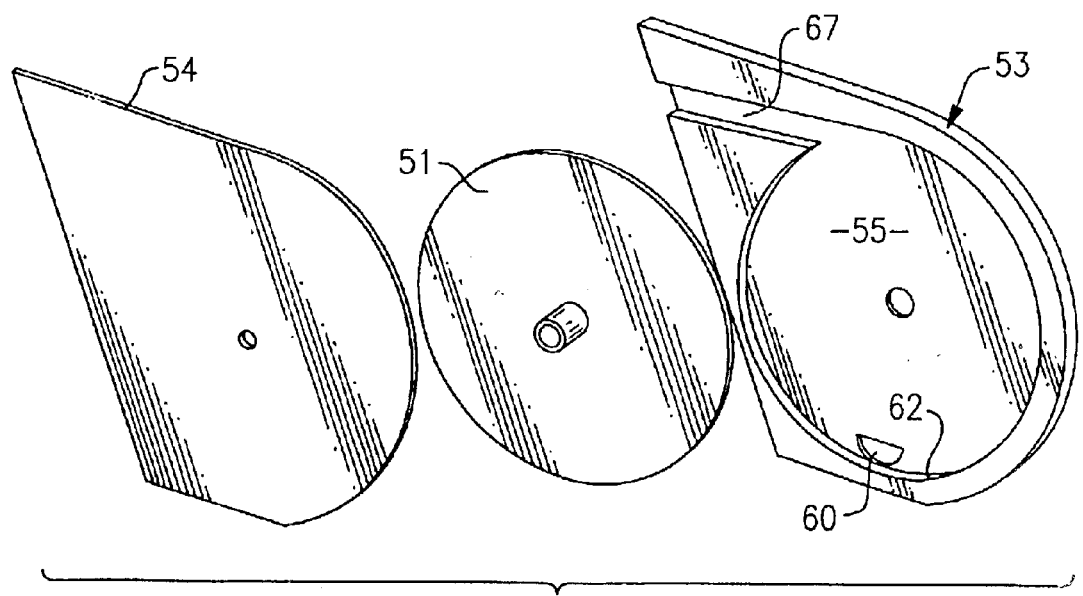
FIG. 5 is a rear side exploded view in perspective showing the components part of the condensate pump.

A condensate pump, generally references 50, is mounted in front of the evaporator coil 17 in coaxial alignment with the blower wheels 20—20. As illustrated in FIGS. 4–6, the pump includes a flat faced circular disc 51 that is secured to the drive shaft 30 which services the evaporator blowers. The disc is contained within a two piece housing that includes a main body section 53 and a side cover section 54. A cavity 55 is formed in the main body section of the housing. The cavity and the cover coact to form the two vertical side walls 57 and 58 (FIG. 6) of the cavity.

An inlet port 60 is provided in the main body section of the housing through which condensate from the evaporator coil is permitted to enter the lower sump region 62 of the pump cavity. A drip pan 63 is located beneath the evaporator coil. The floor 64 of the pan slopes downwardly toward a trough 65 which, in turn, slopes toward the inlet port of the pump so that any condensate that is collected in the trough is directed into the sump of the pump housing. A chamber 67 is located in the upper part of the housing cavity and the chamber is tangentially aligned with the disc.

As illustrated in FIG. 6, the flat surfaces of the disc are mounted in close proximity with the vertical side walls of the pump housing cavity so that sufficient friction is developed by the spinning disc to pump the condensate in the sump of the housing into the upper chamber 67. A discharge tube 70 is connected into the upper chamber of the housing and, as illustrated in FIG. 2, the tube extends back around the evaporator coil and terminates in a planar end section 71 that is adjacent to the upper surface of the condenser coil. A series of discharge ports 73 are placed in the end section of the tube and are arranged to discharge condensate over the heat exchanger surfaces of the condenser coil. As a result, the condensate is evaporated and the water vapor is discharged from the unit into the surrounding ambient through the opening in the upper part of the cover.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A compact roof top air conditioning unit for a vehicle, said unit having an evaporator coil mounted adjacent to a condenser coil, wherein said unit further includes:
   - at least one cylindrical blower mounted upon a horizontally disposed shaft for moving return air from a conditioned region inside said vehicle over the coil;
   - an electrical drive motor for turning said shaft;
   - a drip pan mounted beneath the evaporator coil, said drip pan having a trough for conducting condensate away from the evaporator coil;
   - a circular disc secured to said shaft for turning within a vertical plane;
   - a housing surrounding said disc, said housing having a sump and an intake port in a lower section thereof, said intake port communicating with said trough so that condensate in said trough flows into said sump and is carried by said disc to a higher elevation as said disc turns;
   - a chamber tangentially aligned with said disc in the upper part of the housing wherein condensate that is carried upwardly by said disc is delivered into said chamber; and
   - a discharge tube connected to said chamber for passing condensate from said chamber over condenser coil surfaces.

2. The air conditioning unit of claim 1 wherein said trough is inclined downwardly toward said intake opening in the housing.

3. The air conditioning unit of claim 1 wherein said housing contains inner vertical side walls that are spaced apart a given distance from opposed sides of said disc so that the condensate inside the sump is moved by friction from the sump into said chamber as the disc turns.

4. The air conditioning unit of claim 1 wherein said drive means turns said disc at a speed sufficient to raise the condensate in the sump to the level of said chamber.

5. The air conditioning unit of claim 1 wherein said discharge tube has a linear end section that passes over the condenser coil, said end section having a series of spaced apart discharge ports for distributing condensate over the surface of said condenser coil.

6. The air conditioner unit of claim 1 wherein said housing is divided vertically into two sections that include a body section and a side cover section.

7. The air conditioning unit of claim 1 wherein said unit further includes an electrically driven compressor.

8. The air conditioning unit of claim 7 that further includes an inverter for regulating the electrical input to the compressor and the drive means.

9. A compact rooftop air conditioning unit for a vehicle, said unit having an evaporator coil mounted in front of a condenser coil, wherein said unit further includes:
- an electrical compressor for moving refrigerant between said coils;
- at least one cylindrical blower mounted upon a horizontally disposed shaft for moving return air from inside the vehicle through the evaporator coil;
- an electrical drive means for turning said shaft;
- an inverter for controlling the electrical input to said compressor and said drive means; and
- a pump means secured to said shaft for pumping condensate from a trough near the evaporator coil to a surface of the condenser coil.

10. The air conditioning unit of claim 9 wherein said pump means further includes a flat disc having opposed vertical side surfaces, said disc being secured to said shaft and a pump housing for enclosing said disc.

11. The air conditioning unit of claim 10 wherein said pump housing contains a sump in the lower section thereof and a collection chamber that is tangentially aligned with said disc contained in the upper section of said housing.

12. The air conditioning unit of claim 11 wherein said pump housing contains inner vertical walls that are spaced closely to opposed side surfaces of the disc wherein condensate that is collected in the sump of the housing is pumped into the chamber as the disc is turned by the shaft.

13. The air conditioning unit of claim 12 that further includes a discharge tube connected to said chamber for distributing condensate from said chamber over the surface of the condenser coil.

14. The air conditioning unit of claim 9 and including a drip pan located beneath the evaporator and sloped toward said trough.

15. The air conditioning unit of claim 9 and including a discharge tube for conducting the flow of condensate from said pump to said condenser coil.

* * * * *